United States Patent [19]

Schmidlin

[11] Patent Number: 4,903,050

[45] Date of Patent: Feb. 20, 1990

[54] TONER RECOVERY FOR DEP CLEANING PROCESS

[75] Inventor: Fred W. Schmidlin, Pittsford, N.Y.

[73] Assignee: Xerox Corporation, Stamford, Conn.

[21] Appl. No.: 375,163

[22] Filed: Jul. 3, 1989

[51] Int. Cl.⁴ .............................................. G01D 15/00

[52] U.S. Cl. .................................. 346/160.1; 346/155

[58] Field of Search ...................... 346/159, 153.1, 150, 346/155, 160.1

[56] References Cited

U.S. PATENT DOCUMENTS

| | | | |
|---|---|---|---|
| 3,689,935 | 9/1972 | Pressman et al. | 346/74 ES |
| 3,778,678 | 12/1973 | Masuda | 317/3 |
| 3,801,869 | 4/1974 | Masuda | 317/3 |
| 3,872,361 | 3/1975 | Masuda | 317/262 E |
| 4,491,855 | 1/1985 | Fuji et al. | 346/159 |
| 4,568,955 | 2/1986 | Hosoya et al. | 346/153.1 |
| 4,647,179 | 3/1987 | Schmidlin | 355/3 DD |
| 4,743,926 | 5/1988 | Schmidlin et al. | 346/160.1 |
| 4,755,837 | 7/1988 | Schmidlin et al. | 346/155 |
| 4,780,733 | 10/1988 | Schmidlin et al. | 346/160.1 |
| 4,799,070 | 1/1989 | Nishikawa | 346/159 |
| 4,814,796 | 3/1989 | Schmidlin | 346/155 |

*Primary Examiner*—Arthur G. Evans

[57] ABSTRACT

Direct electrostatic printing (DEP) is enhanced by the provision of a shutter mechanism for preventing toner dislodged from the backside of a printhead structure from being deposited on copy substrates. The shutter is interposed between the printhead structure and the copy substrate during a cleaning cycle. The dislodged toner is removed from between the printhead structure and the copy substrate with a combination vacuum and toner collection device.

12 Claims, 2 Drawing Sheets

TONER RECOVERY FOR DEP CLEANING PROCESS

BACKGROUND OF THE INVENTION

This invention relates to electrostatic printing devices and more particularly to a toner removal and recovery system for a direct electrostatic printing apparatus.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known and utilized form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printing. In the Pressman et al device the supply of the toner to the control member is not uniformly effected and irregularities are liable to occur in the image on the image receiving member. High-speed recording is difficult and moreover, the openings in the printhead are liable to be clogged by the toner.

U.S. Pat. No. 4,491,855 issued on Jan. 1, 1985 in the name of Fuji et al discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fuji et al lies in that the charged particles are supported on a supporting member and an alternating electric field is applied between the supporting member and the control electrode. Fuji et al purports to obviate the problems noted above with respect to Pressman et al. Thus, Fuji et al alleges that their device makes it possible to sufficiently supply the charged particles to the control electrode without scattering them.

U.S. Pat. No. 4,568,955 issued on Feb. 4, 1986 to Hosoya et al discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et al device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. Pat. No. 4,647,179 granted to Fred W. Schmidlin on Mar. 3, 1987 discloses a toner transporting apparatus for use in forming powder images on an imaging surface. The apparatus is characterized by the provision of a travelling electrostatic wave conveyor for the toner particles for transporting them from a toner supply to an imaging surface. The conveyor comprises a linear electrode array consisting of spaced apart electrodes to which a multiphase a.c. voltage is connected such that adjacent electrodes have phase shifted voltages applied thereto which cooperate to form the travelling wave.

U.S. Pat. No. 3,872,361 issued to Masuda discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one terminal of a multi-phase alternating high voltage source. Adjacent electrodes along the path are connected with different terminals in a regular sequence, producing a wave-like, non-uniform electric field that repels electrically charged particles axially inwardly and tends to propel them along the path.

U.S. Pat. No. 3,778,678 also issued to Masuda relates to a similar device as that disclosed in the aforementioned '361 patent.

U.S. Pat. No. 3,801,869 issued to Masuda discloses a booth in which electrically charged particulate material is sprayed onto a workpiece having an opposite charge, so that the particles are electrostatically attracted to the workpiece. All of the walls that confront the workpiece are made of electrically insulating material. A grid-like arrangement of parallel, spaced apart electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic or electrodynamic printing.

The Masuda devices all utilize a relatively high voltage source (i.e. 5–10 KV) operated at a relatively low frequency, i.e. 50 Hz, for generating his travelling waves. In a confined area such as a tube or between parallel plates the use of high voltages is tolerable and in the case of the '869 patent even necessary since a high voltage is required to charge the initially uncharged particles.

In U.S. patent application Ser. No. 374,376, now abandoned and its foreign counterpart (Attorney's docket No. FX4072) filed in Japan on May 7, 1981 there is disclosed a device comprising an elongated conduit which utilizes travelling waves for transporting toner from a supply bottle to a toner hopper.

U.S. Pat. No. 4,743,926 granted on May 10, 1988 to Schmidlin et al and assigned to the same assignee as the instant invention discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '926 patent, a single charged toner conveyor is supplied by a pair of three-phase generators which are biased by a dc source which causes toner of one polarity to travel in one direction on the electrode array while toner of the opposite polarity travels generally in the opposite direction.

In an additional embodiment disclosed in the '926 patent, a toner charging device is provided which charges uncharged toner particles to a level sufficient for movement by one or the other of the aforementioned charged toner conveyors.

The toner in a device such as disclosed in the '926 patent is extracted from the "tops" of the clouds via the fringe fields that extend into the clouds from around the apertures. The efficiency of toner usage in a charged toner conveyor of the type disclosed in the '937 application is currently limited by the relatively dilute toner density in the "tips" of the toner clouds that are transported thereby.

U.S. Pat. No. 4,814,796 granted on Mar. 21, 1989 to Fred W. Schmidlin and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign and size toner. To this end, the developer delivery system includes a conventional magnetic brush which delivers toner to a donor roll structure which, in turn, delivers toner to the vicinity of apertures in the printhead structure.

U.S. Pat. No. 4,780,733 granted on Oct. 25, 1988 to Fred W. Schmidlin and assigned to the same assignee as the instant invention discloses a direct electrostatic printing apparatus including structure for delivering developer or toner particles to a printhead forming an integral part of the printing device. The printing device includes, in addition to an apertured printhead, a conductive shoe which is suitably biased during a printing cycle to assist in the electrostatic attraction of developer through apertures in the printhead onto the copying medium disposed intermediate the printhead and the conductive shoe. Toner is delivered to the printhead via a pair of opposed charged toner conveyors. One of the conveyors is attached to the printhead and has an opening therethrough for permitting passage of the toner from between the conveyors to areas adjacent the apertures in the printhead.

U.S. Pat. No. 4,755,837 granted on July 5, 1988 to Fred W. Schmidlin and assigned to the same assignee as the instant invention discloses a direct electrostatic printing apparatus including structure for removing wrong sign developer particles from a printhead forming an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the shoe and an electrical bias suitable for creating an oscillating electrostatic field which effects removal of toner from the printhead is applied to the shoe. The toner particles so removed are attracted to the copy medium in areas away from the image areas.

With regard to the device described by Hosoya in U.S. Pat. No. 4,568,955, it is obvious to anyone skilled in electrostatics that the toner resting in the bottom of the reservoir under the force of gravity alone must be charge neutral or very nearly neutral. Thus, even though some toner may be charged by friction with the agitator installed in the bottom of the reservoir, as alleged by Hosoya, other nearby toner must acquire charge of the opposite polarity. As a reuslt, any toner extracted from the bed by the toner carrying plate, with its inclined end immersed in said bed of toner, must be toner having a charge which is low in absolute value and/or of mixed polarity. It should also be noted that since the toner carrying plate has a relatively course grid structure (less than 50 lines per inch), it must operate at high voltages (>1000 volts rms) and at relatively low frequency (<1000 Hz). In other words, from the course grid structure and the fact that it is alleged to extract toner from a reservoir, it is evident that Hosoya's device is intended to operate much like Masuda's electric curtain which normally transports bipolar material. Another feature of Hosoya's toner carrying plate which necessitates the handling of neutral or mixed polarity toner is the absence of any means to aid the return of the toner to the reservoir. If the toner did possess a net charge the pile of toner accumulated in the reservoir near the end of the toner carrying plate would produce a strong repulsive field and prevent additional toner from escaping from the toner carrying member. Experience with transporting charge toner via a travelling wave shows that charged toner must be assisted off the carrying plate or it will block and back up on the plate in a manner analogous to a traffic jam and further transport comes to a halt. Still another feature of Hosoya's device which restricts it to the use of low charged toner or very low toner density in the transported cloud, called "smoke" by Hosoya, is the relatively large distance (−2 mm) between the toner carrying plate and the control aperture. Because of these features Hosoya's printer is restricted to printing at very low speeds (<1 cm/sec) and is incapable of printing page length (−27 cm) images without plugging the apertures. The present invention overcomes these limitations and makes it possible to repeatedly print page length images at high speeds (>2 cm/sec) for extended periods of time.

BRIEF SUMMARY OF THE INVENTION

The present invention is directed to a direct electrostatic printing (DEP) apparatus comprising a supply of charged toner disposed adjacent one side of an apertured printhead structure and an image receiving member disposed adjacent the other side thereof. Toner particles which accumulate on the side of the printhead structure adjacent the image receiving member are dislodged by toner particles from the supply which are caused to bombard the side of the printhead structure.

In accordance with cleaning method disclosed in the '837 patent noted above, the dislodged particles are attracted to the imaging member in the interdocument area. As will be appreciated, the toner which is attracted to the imaging member is both unattractive and wasteful.

Thus, in accordance with the present invention, the dislodged toner is prevented from being attracted to the imaging member by the insertion of a shutter member between the printhead structure and the imaging receiving member during the time when the accumulated toner is being dislodged. A vacuum source is provided close to the dislodged toner for removal of the toner and for transporting it to a collection container.

DETAILED DESCRIPTION OF THE DRAWINGS

Figure 1:
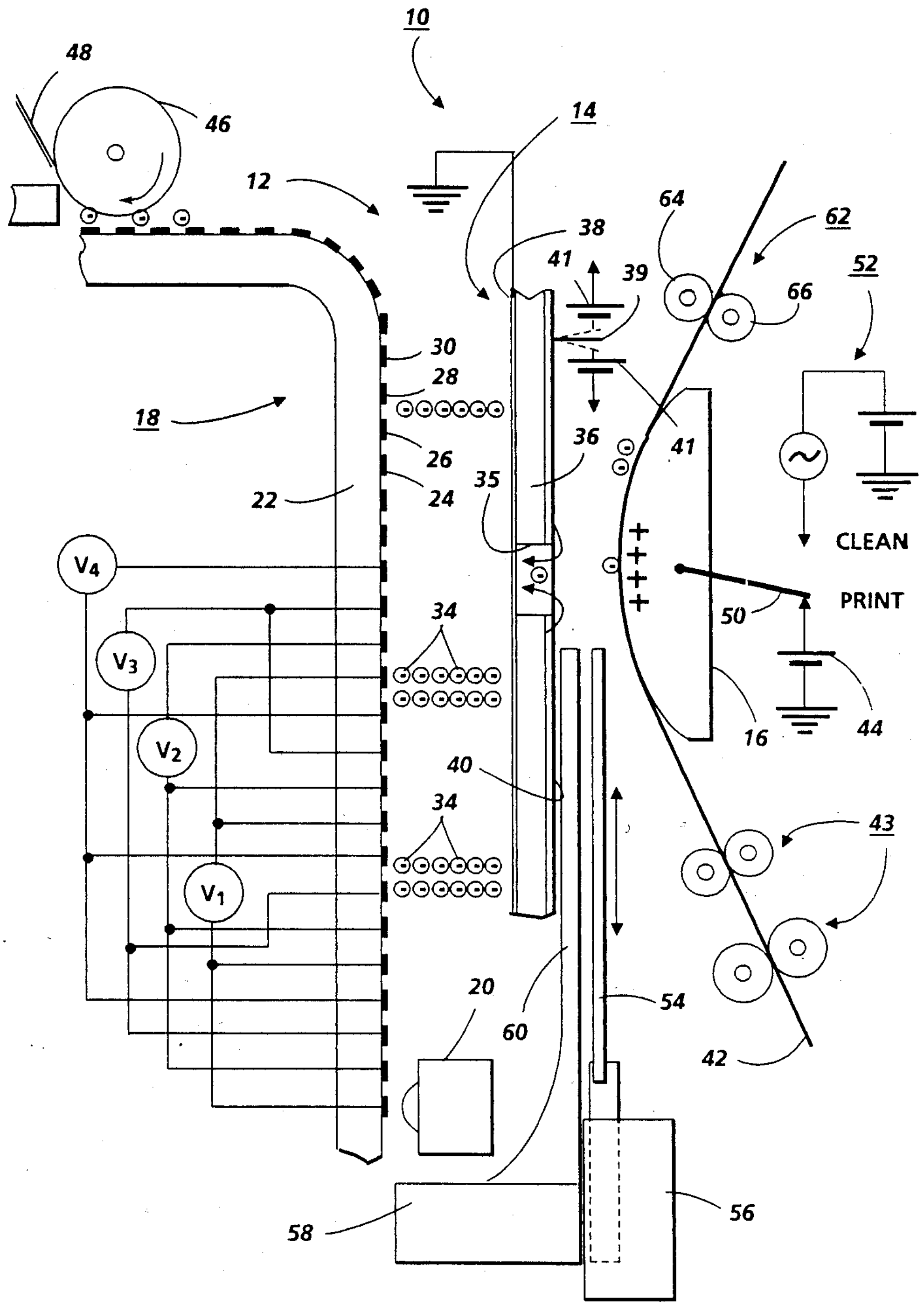
Figure 2:
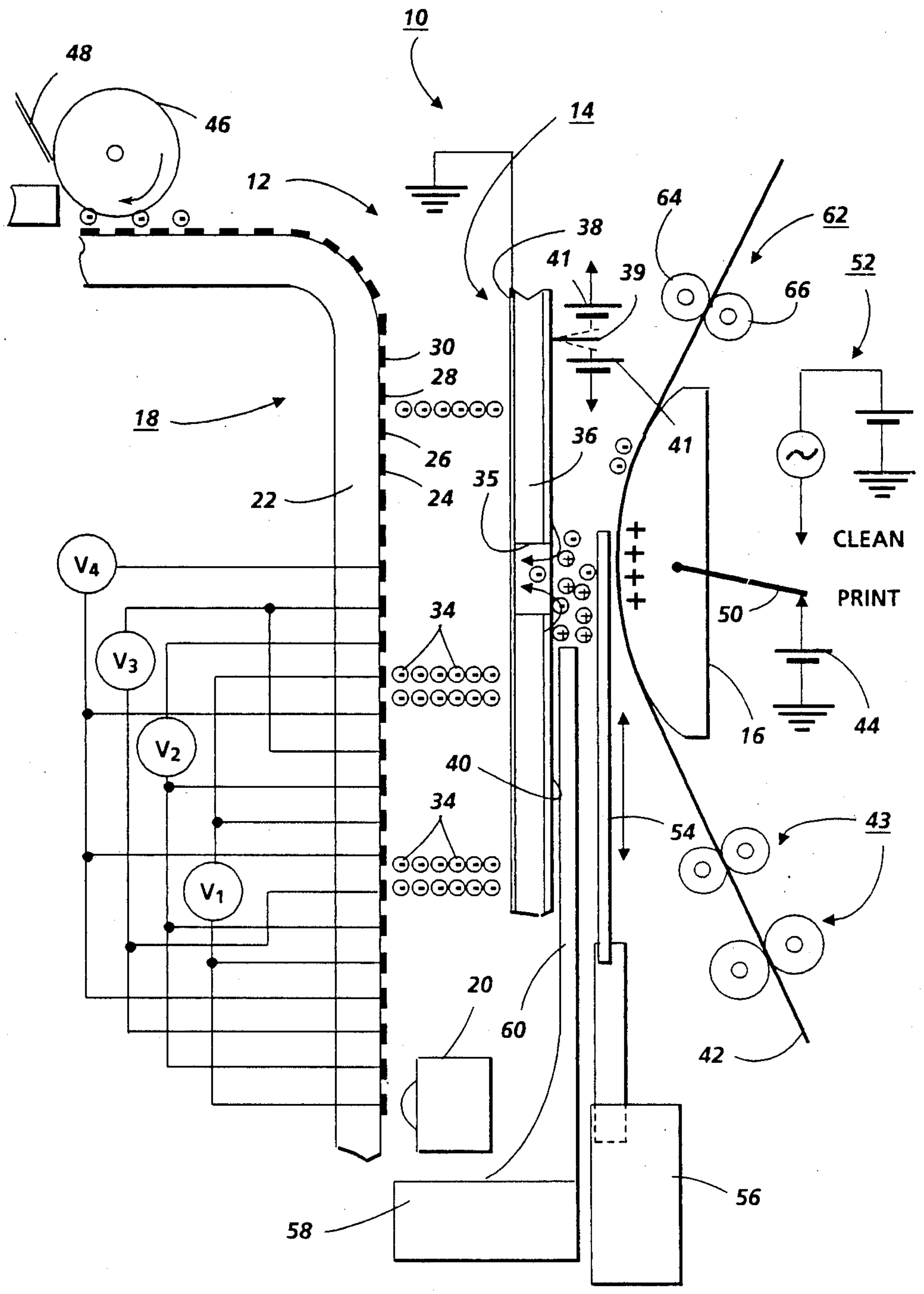

FIG. 1 is a schematic illustration of a direct electrostatic printing apparatus and toner recovery system with the latter in its inactive position and FIG. 2 is a schematic illustration of a direct electrostatic printing apparatus and toner recovery system illustrating the latter in its operative position.

DESCRIPTION OF THE PREFERRED EMBODIMENT OF THE INVENTION

Disclosed in the Figure is an embodiment of a direct electrostatic printing apparatus 10 representing the invention.

The printing apparatus 10 includes a developer delivery or conveying system generally indicated by reference character 12, a printhead structure 14 and a backing electrode or shoe 16.

The developer delivery system 12 includes a charged toner conveyor (CTC) 18 and a magnetic brush developer supply 20. The charged toner conveyor 18 comprises a base member 22 and an electrode array comprising repeating sets of electrodes 24, 26, 28 and 30 to which are connected A.C. voltage sources $V_1$, $V_2$, $V_3$ and $V_4$ which voltage sources are phase shifted one from the other so that an electrostatic travelling wave pattern is established.

The effect of the travelling wave pattern established by the conveyor 18 is to cause already charged toner particles 34 delivered to the conveyor via the developer supply 20 to travel along the CTC to an area opposite the printhead apertures 35 where they come under the influence of electrostatic fringe fields emanating from the printhead 14 and ultimately under the influence of the field created by the voltage applied to the shoe 16. To enhance the interaction between the fringe fields and the toner travelling on the CTC the distance between the CTC and the printhead should be less than three wavelengths, or 12 electrode spacings on the CTC for a four phase CTC, and preferably less than one wavelength. A narrow CTC/printhead spacing facilitates a high delivery rate of usable toner and therefore a high printing speed.

By way of example, the developer comprises any suitable insulative non-magnetic toner/carrier combination having Aerosil (Trademark of Degussa, Inc.) contained therein in an amount approximately equal to 0.3 to 0.5% by weight and also having zinc stearate contained therein in an amount approximately equal to 0.1 to 1.0% by weight. It should be appreciated however that the optimal amount of additives (Aerosil and zinc stearate) will vary depending on the base toner material, coating material on the CTC and the toner supply device.

The printhead structure 14 comprise a layered member including an electrically insulative base member 36 fabricated from a polyimide film having a thickness in the order of 1 to 2 mils (0.025 to 0.50 mm). The base member is clad on the one side thereof with a continuous conductive layer or shield 38 of aluminum which is approximately 1 micron (0.001 mm thick). The opposite side of the base member 36 carries segmented conductive layer 40 thereon which is fabricated from aluminum and has a thickness similar to that of the shield 38. The total thickness of the printhead structure is in the order of 0.001 to 0.002 inch (0.027 to 0.52 mm).

A plurality of holes or apertures 35 (only one of which is shown) approximately 0.15 mm in diameter are provided in the layered structure in a pattern suitable for use in recording information. The apertures form an electrode array of individually addressable electrodes. With the shield 38 grounded and with 0–100 volts applied to an addressable electrode, toner is propelled through the aperture associated with that electrode. The aperture extends through the base 36 and the conductive layers 38 and 40.

With a negative 350 volts applied to an addressable electrode 40 via switch 39 and a dc power source 41 toner is prevented from being propelled through the aperture 35. Image intensity can be varied by adjusting the voltage on the control electrodes between 0 and minus 350 volts. Addressing of the individual electrodes can be effected in any well known manner known in the art of printing using electronically addressable printing elements.

The electrode or shoe 16 has an arcuate shape as shown but as will be appreciated, the present invention is not limited by such a configuration. The shoe which is positioned on the opposite side of a plain paper recording medium 42 from the printhead 14 supports the recording medium in an arcuate path in order to provide an extended area of contact between the medium and the shoe.

The recording medium 42 may comprise roll paper or cut sheets of paper fed from a supply tray, not shown. The sheets of paper are spaced from the printhead 14 a distance in the order of 0.002 to 0.030 inch as they pass thereby. As a general rule the smaller the spacing the higher the resolution at higher printing speeds through at the expense of maintaining greater precision in the gap between the printhead and paper. The recording medium 42 is transported in contact with the shoe 16 via edge transport roll pairs 43.

During printing the shoe 16 is electrically biased to a dc potential of approximately 400 volts via a dc voltage source 44. Toner on the CTC not passed through the printhead is removed from the CTC downstream with an electrostatic pickoff device comprising a biased roll 46 and scraper blade 48. A vacuum pickoff device can be used in lieu of the electrostatic one.

Due to wrong sign toner becoming agglomerated on electrode 40 of the printhead 14, a switch 50 is periodically actuated such that a dc biased AC power supply 52 is connected to the shoe 16 to effect cleaning of the printhead. The voltage from the source 52 is supplied at a frequency which causes toner travelling through the apertures 35 into the gap between the paper and the printhead to oscillate and bombard the printhead.

Momemtum transfer between the oscillating toner and any accumulated toner on the control electrodes 40 of the printhead causes the toner on the control electrodes to become dislodged. In order to prevent the dislodged toner from being deposited on the recording medium 42, a shutter 54 is moved from its inactivated position shown in FIG. 1 to its activated position shown in FIG. 2. Movement of the shutter between its active and inactive positions is effected by means of a solenoid 56. In the position shown in FIG. 2, the shutter 54 blocks the dislodged toner thereby precluding contact thereof with the paper 42. A combination vacuum source and storage container 58 serves to draw the toner through a conduit 60 after it is dislodged from electrode 40 of the printhead structure 14.

At the fusing station, a fuser assembly, indicated generally by the reference numeral 62, permanently affixes the transferred toner powder images to recording medium 42. Preferably, fuser assembly 62 includes a heated fuser roller 64 adapted to be pressure engaged with a back-up roller 66 with the toner powder images contacting fuser roller 64. In this manner, the toner powder image is permanently affixed to substrate 42. After fusing, a chute, now shown, guides the advancing substrate 42 to catch tray, also not shown, for removal from the printing machine by the operator.

A typical width for each of the electrodes for the travelling wave grid is 1 to 4 mils (0.025 to 0.10 mm). Typical spacing between the centers of the electrodes is twice the electrode width and the spacing between adjacent electrodes is approximately the same as the electrode width. Typical operating frequency is between 1000 and 10,000 Hz for 125 Ipi grids 4 mil (0.10 mm) electrodes, the drive frequency for maximum transport rate being 2,000 Hz.

A typical operating voltage is relatively low (i.e. less than the Paschen breakdown value) and is in the range of 30 to 1000 depending on grid size, a typical value being approximately 500 V for a 125 Ipi grid. Stated differently, the desired operating voltage is approximately equal to 100 times the spacing between centers of adjacent electrodes.

While the electrodes may be exposed metal such as Cu or Al it is preferred that they be covered or overcoated with a thin oxide or insulator layer. A thin coating having a thickness of about half of the electrode width will sufficiently attenuate the higher harmonic frequencies and suppress attraction to the electrode edges by polarization forces. A slightly conductive over-coating will allow for the relaxation of charge accumulation due to charge exchange with the toner. To avoid excessive alteration of the toner charge as it moves about the conveyor, however, a thin coating of a material which is non-tribo active with respect to the toner is desirable. A weakly tribo-active material which maintains the desired charge level may also be utilized.

A preferred overcoating layer comprises a strongly injecting active matrix such as the disclosed in U.S. Pat. No. 4,515,882 granted in the name of Joseph Mammino et al on or about May 7, 1985 and assigned to the same assignee as the instant application. As disclosed therein, the layer comprises an insulating film forming continuous phase comprising charge transport molecules and finely divided charge injection enabling particles dispersed in the continuous phase. A polyvinylfluoride film available from the E. I. duPont de Nemours and Company under the tradename Tedlar has also been found to be suitable for use as the overcoat.

While a single CTC has been disclosed it will be appreciated that cooperating charged toner conveyors such as disclosed in the '733 patent could be utilized. Also, any toner supply, including a magnetic brush loaded donor as described in the '796 patent can be utilized in conjunction with the presently described toner removal and recovery system.

What is claimed is:

1. Direct electrostatic printing apparatus, said apparatus comprising:

a supply of charged toner particles;

an apertured printhead structure through which toner particles pass in image configuration;

an image receiving member disposed adjacent one side of said apertured printhead;

means for supporting said image receiving member past said apertured printhead;

means for effecting the attraction of toner particles from said apertured printhead structure to said image receiving member;

means for periodically causing toner particles from said supply to bombard the side of said printhead structure disposed between said image receiving member and said printhead structure whereby momentum transfer between said toner particles caused to bombard said side and toner particles which have accumulated on said side causes said accumulated toner to become dislodged; and means for preventing dislodged toner from being deposited on said image receiving member.

2. Apparatus according to claim 1 wherein said preventing means comprises a shutter member interposed between said side and said image receiving member.

3. Apparatus according to claim 2 including means for effecting positioning of said shutter member intermediate said side and said image receiving member simultaneously with the actuation of said means for periodically causing toner particles from said supply to bombard the side of said printhead structure disposed between said image receiving member and said printhead structure.

4. Apparatus according to claim 3 including means for removing said dislodged toner from between said side and said shutter.

5. Apparatus according to claim 4 wherein said removing means comprises a vacuum device.

6. Apparatus according to claim 5 including means for collecting said dislodged toner.

7. The method of printing images, said method including the steps of:

supplying toner particles to an apertured printhead structure;

supporting an image receiving member to one side of said apertured printhead structure;

attracting toner particles from said apertured printhead structure to said image receiving member;

periodically causing toner particles from said supply to bombard the side of said printhead structure disposed between said image receiving member and said printhead structure whereby momemtum transfer between said toner particles caused to bombard said side and toner particles which have accumulated on said side causes said accumulated toner to become dislodged; and preventing dislodged toner from being deposited on said image receiving member.

8. The method according to claim 7 wherein said step of preventing dislodged toner from being deposited on said image receiving member comprises positioning a shutter between said side and said image receiving member.

9. The method according to claim 8 including the step of positioning of said shutter member intermediate said side and said image receiving member simultaneously with the actuation of said means for periodically causing toner particles from said supply to bombard the side of said printhead structure disposed between said image receiving member and said printhead structure.

10. The method according to claim 9 including the step of removing said dislodged toner from between said side and said shutter.

11. The method according to claim 10 including the step of collecting said dislodged toner.

12. The method according to claim 11 wherein said removing step comprises the use of a vacuum device.

* * * * *